(12) United States Patent
Sakai et al.

(10) Patent No.: US 6,516,602 B2
(45) Date of Patent: Feb. 11, 2003

(54) FLEXIBLE CABLE SUPPORT AND GUIDE DEVICE

(75) Inventors: Toshimitsu Sakai, Osaka (JP); Michiya Hashino, Osaka (JP); Shoichiro Komiya, Osaka (JP); Takayuki Matsuda, Osaka (JP); Michiyo Mizumoto, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 65 days.

(21) Appl. No.: 09/846,670

(22) Filed: May 1, 2001

(65) Prior Publication Data

US 2002/0043591 A1 Apr. 18, 2002

(30) Foreign Application Priority Data

May 1, 2000 (JP) ........................................ 2000-132404

(51) Int. Cl.[7] .............................................. F16G 13/02
(52) U.S. Cl. .......................................... 59/78.1; 248/49
(58) Field of Search ...................... 248/49, 51; 59/78.1

(56) References Cited

U.S. PATENT DOCUMENTS 3,273,057 A * 9/1966 Peterson et al. ............ 324/548
4,600,817 A * 7/1986 Hackenberg ................. 59/78.1
5,332,865 A * 7/1994 Jensen ........................ 59/78.1
5,836,148 A * 11/1998 Fukao ........................ 248/49
6,354,070 B1 * 3/2002 Blase ......................... 59/78.1

FOREIGN PATENT DOCUMENTS

| JP | 57-16273 | 4/1982 |
| JP | 2-40135 | 9/1990 |
| JP | 10-28310 | 1/1998 |

* cited by examiner

Primary Examiner—David Jones
(74) Attorney, Agent, or Firm—Dann, Dorfman, Herrell & Skillman; Henry H. Skillman

(57) ABSTRACT

A flexible support and guide device includes a movable cable holder wound around a pair of pulleys rotatably supported on opposite ends of a support rod. The cable holder is comprised of a looped belt trained around the pulleys, and a pair of flexible tubes carried on an outer circumferential surface of the belt with ends of the tubes confronting each other mutually, the tubes accommodating within them cables. The cable holder has a movable end formed jointly by one pair of mutually confronting ends of the two tubes for enabling connection of the cables to a mobile machine or a movable machine part, and a fixed end formed jointly by the other pair of mutually confronting ends of the tubes for enabling connection of the cables to a fixed external power source.

13 Claims, 5 Drawing Sheets

FLEXIBLE CABLE SUPPORT AND GUIDE DEVICE

BACKGROUND OF THE INVENTION

The present invention relates to a flexible cable support and guide device for safely and surely supporting and guiding electric cables, optical fiber cables, liquid supply hoses or the like flexible cables used for feeding energy, such as electric power or working fluid, to machine tools, electronic equipment, industrial robots, conveyance machines or movable parts thereof.

Cable support and guide devices for holding therein cables used to feed electric power or working fluid to a movable part of a machine or a mobile machine are known as disclosed for example in Japanese Patent Publication No. HEI-2-40135 and Japanese Patent Laid-open Publication No. HEI-10-28310.

The cable support and guide device shown in Japanese Patent Publication No. HEI-2-40135 is comprised of a series of U-shaped chain elements articulately connected together to form a flexible chain. The U-shaped chain elements each have two opposed link plates formed as an integral part of each chain element, and a pair of laterally projecting pivot pins and a pair of aligned pin-accommodating holes formed at opposite longitudinal end portions of the link plates. The pivot pins of one chain element are fitted in the pin-accommodating holes of the adjacent chain element so that the chain elements are pivotally movable about the pivot pins. Each chain element further has a cover strip hinged at one end to the upper end of one link plate, the other end of the cover strip being releasably engaged with the upper end of the other link plate so that cables received in the chain are prevented from displacing off the chain.

The cable support and guide device shown in Japanese Patent Laid-open Publication No. HEI-10-28310 has a hollow body molded of synthetic resin and including an elongated bottom wall and two opposed side walls formed integrally with opposite longitudinal edges of the bottom wall. The side walls are segmented into side wall pieces arranged longitudinally of the hollow body so that the bottom wall of the hollow body is flexibly bendable. One side wall has an integral end elongation resiliently bendable to form a top wall of the hollow body, the end elongation being releasably engaged with the upper end of the other side wall. As an alternative, a number of top covers may be removably attached to the upper ends of the side plates. The hollow body further has a series of trapezoidal fins formed on the under surface of the bottom wall along the length of the bottom wall. When the hollow body is bent or flexed, adjacent oblique sides of the trapezoidal fins come into abutment with each other to thereby limit the angle of bend of the hollow body of the chain support and guide device.

The cable support and guide device disclosed in Japanese Patent Publication No. HEI-2-40135 has a problem that the structure is likely to sag under the weight of the cables accommodated in the cable support and guide device. To deal with this problem, an attempt has been made to initially form the cable support and guide device into an upwardly curved bow-like configuration such that, when loaded (i.e., when cables are placed therein), the upwardly curved cable support and guide device assumes a flattened configuration. However, due to its initial bow-like configuration, the cable support and guide device requires a relatively large vertical space for installation thereof. In use, the cable support and guide device is pushed and pulled to slide along a traveling path and hence is subjected to a relatively large frictional resistance against movement thereof. As a consequence, repeated use of the cable support and guide device would cause deformation of the pivot pins, pin-receiving holes and tilt-angle limiting stoppers of the chain elements due to wear or fatigue. This may result in accidental separation of the chain elements, making the cable support and guide device inoperative as a whole.

The cable support and guide device disclosed in Japanese Patent Laid-open Publication No. HEI-10-28310 also has a problem that due to its resiliently deformable molded structure, the hollow is likely to buckle at a curved or bent portion thereof when subjected to a heavy load applied from the above, thus failing to maintain an accurate radius of curvature of the bent portion. Further, the hollow body molded of synthetic resin is susceptible to distortion, is difficult to support heavy cables, is likely to become unstable and cause twisting when weight of the cables is unevenly distributed, may create a sag when traveling along a long straight path, and tends to tilt due to insufficient rigidity when traveling along a curved path.

SUMMARY OF THE INVENTION

It is accordingly an object of the present invention to provide a flexible cable support and guide device having structural features which are able to prevent distortion or twisting of the cable support and guide device from occurring not only when the device is in a stationary state on a horizontal path with cables accommodated therein, but also when the device is achieving a relatively long stroke of travel.

Another object of the present invention is to provide a flexible cable support and guide device which is easily drivable and capable of moving smoothly without creating undue frictional resistance.

To achieve the foregoing objects, according to the present invention, there is provided a flexible cable support and guide device comprising a pair of pulleys rotatably supported on opposite ends of a support rod, and a movable cable holder wound around the pulleys. The movable cable holder includes a looped belt trained around the pulleys, a pair of flexible tubes carried on an outer circumferential surface of the belt with ends of the two tubes confronting each other mutually, the tubes accommodating within them cables, and a movable end formed jointly by one pair of mutually confronting ends of the two tubes, and a fixed end formed jointly by the other pair of mutually confronting ends of the two tubes. The cables are pulled out from the movable end of the cable holder for connection to a mobile machine or a movable machine part, and the cables are also pulled out from the fixed end of the cable holder for connection to a fixed external power source.

In one form of the present invention, the pulleys have a flat outer circumferential surface, and the belt comprises a flat belt.

In another form of the present invention, the pulleys comprise toothed pulleys each having evenly spaced teeth on an outer circumferential surface thereof, and the belt comprises a toothed belt having evenly spaced teeth on an inner circumferential surface thereof for mesh with the teeth of the toothed pulleys.

Preferably, the flexible tubes comprise a corrugated tube. The flexible tubes may be made of rubber or molded of synthetic resin. The flexible tubes may be attached by bonding to the outer circumferential surface of the looped belt.

The flexible support and guide device may further comprise a plurality of fasteners detachably connected to the belt to attach the flexible tubes to the outer circumferential surface of the belt. In one preferred form, the belt has a pair of side flanges formed on the outer circumferential surface of the belt and extending along opposite longitudinal edges of the belt, and a plurality of pairs of aligned retaining holes formed in the side flanges and spaced at equal intervals in the longitudinal direction of the belt. The fasteners each comprise a U-shaped fastener strip formed from a resilient material and having a pair of locking pins projecting laterally and outwardly from distal ends of two legs of the U-shaped fastener strip. The locking pins are received in one pair of aligned retaining holes to attach the fastener strip to the belt with the flexible tubes held between the belt and the fastener strip. The side flanges may be provided with a number of transverse slits formed therein at equal intervals in the longitudinal direction of the side flanges.

With the cable support and guide device thus constructed, when one of the pulleys is driven in rotation, the cable holder travels in one or the opposite direction. At the same time, the cable support and guide device itself moves along guide rails installed on a floor surface, for example. In this instance, the fixed end of the cable holder remains stationary while the movable end of the cable holder moves together with the mobile machine or the movable machine part.

BRIEF DESCRIPTION OF THE DRAWINGS

Certain preferred structural embodiments of the present invention will hereinafter be described in detail, by way of example only, with reference to the accompanying drawings, in which.

DETAILED DESCRIPTION OF THE PREFERRED EMBODIMENTS

The following description is merely exemplary in nature and is in no way intended to limit the invention or its application or uses.

Figure 1:
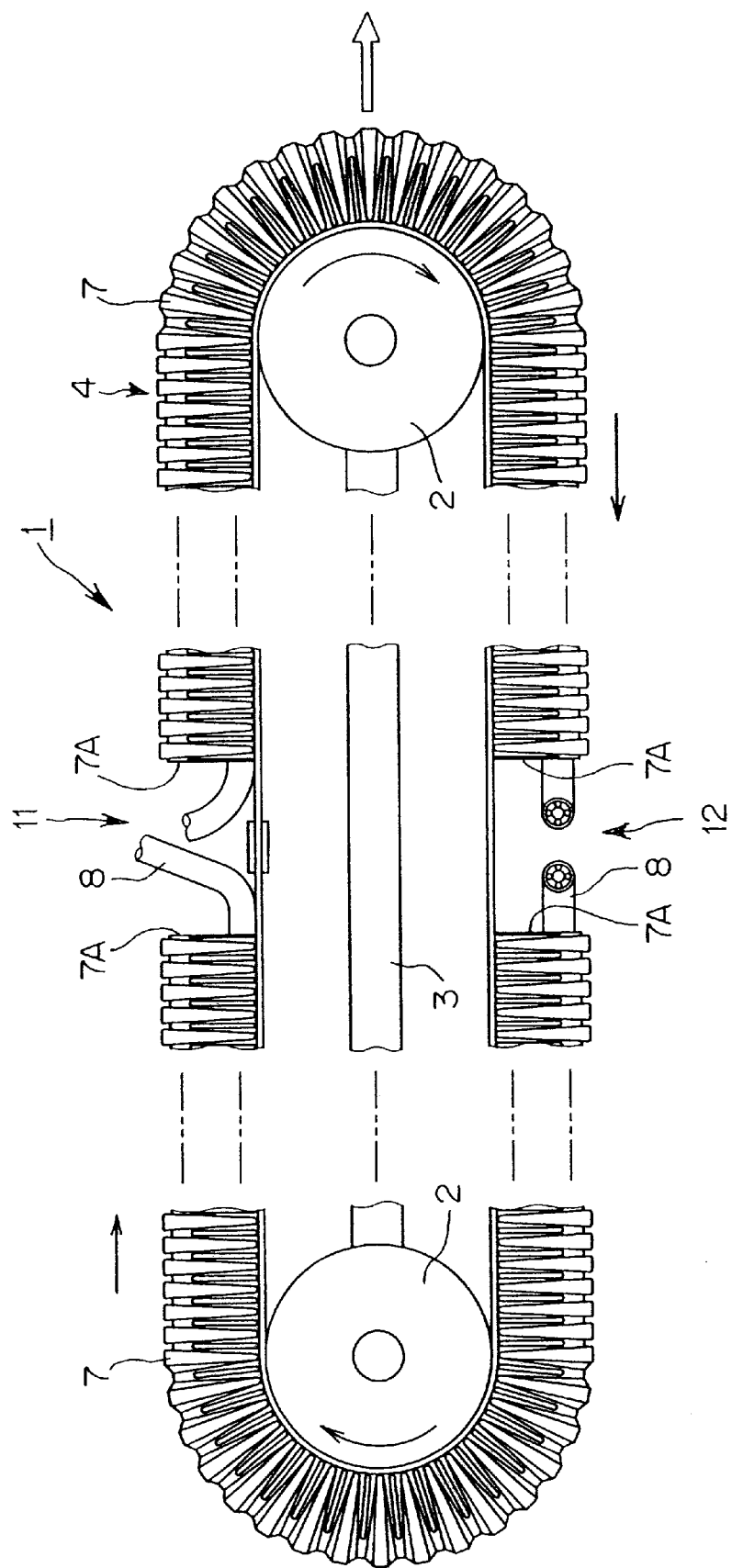
FIG. 1 is a front elevational view of a flexible cable support and guide device according to a first embodiment of the present invention.
Figure 2:
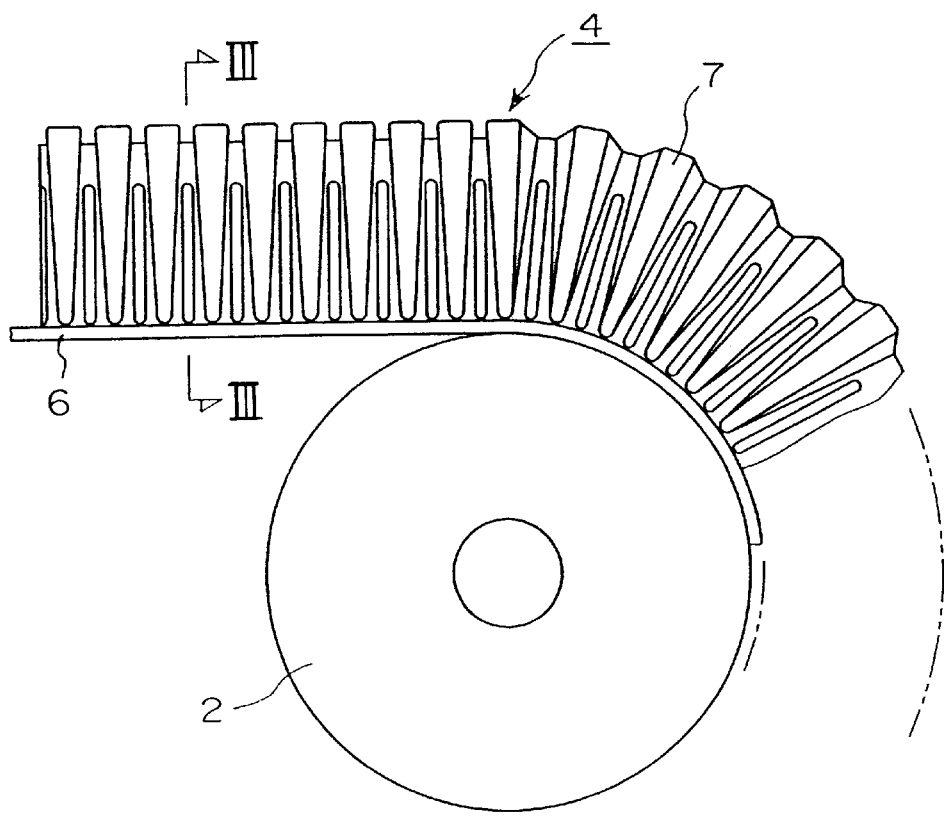
FIG. 2 is an enlarged view of a portion of FIG. 1, showing a pulley and the cable support and guide device wrapped therearound.
Figure 3:
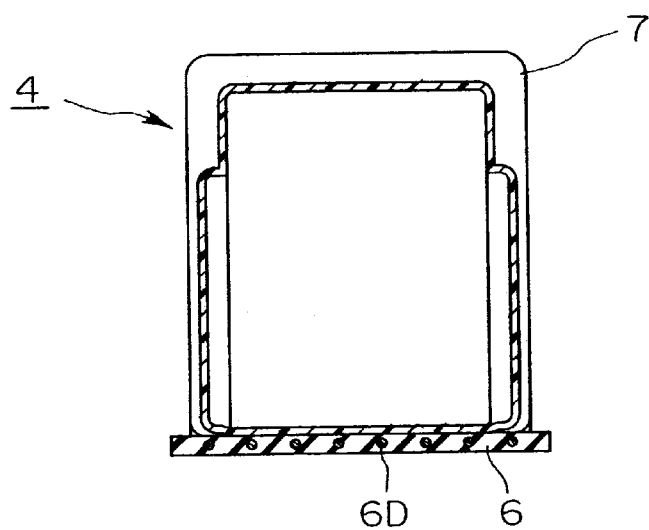
FIG. 3 is a cross-sectional view taken along line III—III of FIG. 2.
Figure 4:
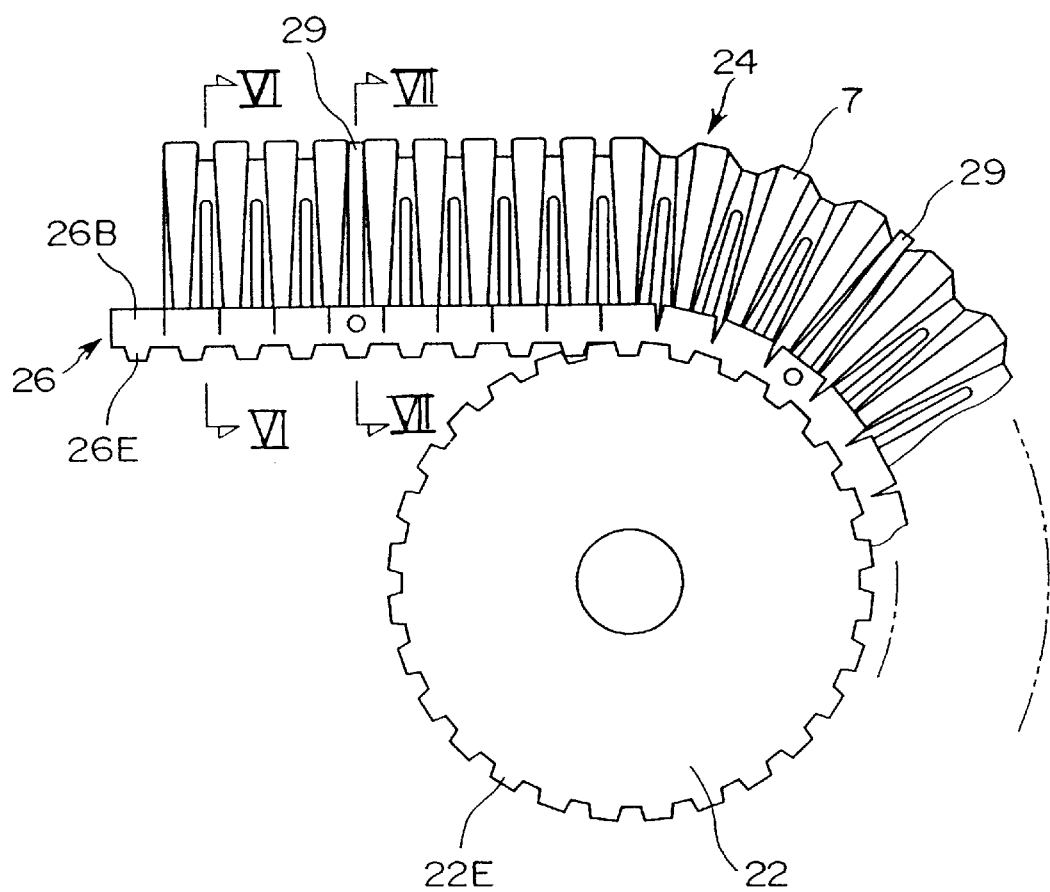
FIG. 4 is a view similar to FIG. 2, but showing a toothed pulley and a cable support and guide device according to a second embodiment of the present invention.

FIGS. 1 to 3 show a flexible cable support and guide device according to a first embodiment of the present invention. As shown in FIG. 1, the cable support and guide device 1 generally comprises a pair of pulleys 2, 2 rotatably supported on opposite longitudinal ends of a support rod 3 disposed horizontally, and an endless movable cable holder 4 wound around the pulleys 2, 2. The support rod 3 may be adjustable in length so that the distance between the pulleys 2, 2 can be varied to apply an appropriate tension to a flat belt, described later, of the movable cable holder 4.

The movable cable holder 4 is comprised of a looped (endless) flat belt 6, a pair of flexible tubes 7, 7 mounted to an outer circumferential surface of the looped flat belt 6 with ends 7A, 7A of the two tubes 7, 7 confronting each other mutually, and cables 8 accommodated within the flexible tubes 7. The flexible tubes 7 in the illustrated embodiment comprise a corrugated tube made of rubber or synthetic resin. The corrugated tubes 7 have a certain degree of elongation and contraction in the longitudinal direction and are bendable in all directions. As shown in FIG. 3, the flexible tubes 7 have a hollow rectangular shape in cross section. The flat belt 6 is made of rubber or synthetic resin and has reinforcement cords 6D embedded longitudinally therein.

As shown in FIG. 2 and 3, each flexible tube 7 is attached by bonding to the outer circumferential surface of the flat belt 6. As an alternative, the flexible tube 7 may be molded integrally with the flat belt 6. Referring back to FIG. 1, one pair of confronting ends 7A, 7A of the two flexible tubes 7, 7 define therebetween a space and jointly form a movable end 11 of the movable cable holder 4. Similarly, the other pair of confront ends 7A, 7A of the two flexible tubes 7, 7 define therebetween a space and jointly form a fixed end 12 of the movable cable holder 4.

The cables 8 are pulled out from the movable end 11 of the movable cable holder 4 and they are connected to a mobile machine or a movable part of a fixed machine (neither shown). The cables 8 are also pulled out from the fixed end 12 of the movable cable holder 4 and they are connected to an external stationary power source (not shown). In this instance, the flat belt 6 may be connected to the mobile machine or the movable part of the fixed machine at a position corresponding to the position of the movable end 11 of the cable holder 4. One of the pulleys 2 is a driving pulley and rotatably driven by an external drive means (not shown). As an alternative, the cable support and guide device 1 may include a motor for driving the driving pulley 2.

The cable support and guide device 1 of the foregoing construction operates as follows.

When the driving pulley 2 is driven by the external drive means, or when the flat belt 6 connected to the mobile machine or the movable part of the fixed machine is driven by the mobile machine or the movable machine part, the movable cable holder 4 moves in one direction indicated by the arrows or the opposite direction. At the same time, the cable support and guide device 1 itself moves while being guided along guide rails (not shown) set on a floor surface or the like, in the same manner as shown in Japanese Patent Publication No. SHO-57-16273. In this instance, the fixed end 12 of the movable cable holder 4 is held stationary while the movable end 11 moves together with the mobile machine or movable machine part.

It may be possible to apply an appropriate tension to the flat belt 6 of the movable cable holder 4 so as to preclude the occurrence of distortion or twisting of straight portions of the cable holder 4 extending horizontally between the pulleys 2. When the traveling stroke of the cable holder 4 is relatively long, or when the cables 8 accommodated within the cable holder 4 are relatively heavy, the tension applied to the flat belt 6 is increased to such an extent that the horizontally extending portions of the cable holder 4 are stretched substantially straight and free from distortion or twisting. In the case where one of the pulleys 2 is driven by the external drive means, it is readily possible to control operation of the pulley 2 and the resulting movement of the cable support and guide device 1 from the external side of the cable support and guide device 1. Alternatively, in the case where the flat belt 6 connected to the mobile machine or movable machine part is driven, the cable holder 4 moves itself to thereby transmit power to the pulleys 2.

FIGS. 4 to 7 show a flexible cable supporting and guiding device according to a second embodiment of the present invention. The cable support and guide device is substantially the same in construction and function as the device 1 of the first embodiment shown in FIGS. 1–3, so that the like or corresponding parts are designated by the same reference characters as in the first embodiment.

The cable support and guide device according to the second embodiment comprises a pair of toothed pulleys 22 (only one shown in FIG. 4) rotatably supported on opposite longitudinal ends of a support rod (not shown but identical to the support rod 3 shown in FIG. 1), and a movable cable holder 24 trained around the toothed pulleys 22.

The movable cable holder 24 includes a looped or endless toothed belt 26 stretched between the pulleys 22, a pair of flexible tubes 7 (only one shown) mounted to an outer circumferential surface of the toothed belt 26 with ends of the two flexible tubes 7 confronting each other mutually, and cables (not shown but identical to those 8 shown in FIG. 1) accommodated within the flexible tubes 7. Each toothed pulley 22 has evenly spaced teeth 22E formed on its circumferential surface for mesh with teeth 26E formed on an inner circumferential surface of the toothed belt 26. The toothed belt 26 is made of rubber or synthetic resin and has reinforcement cords 26D (FIGS. 5–7) embedded therein.

Figure 5:
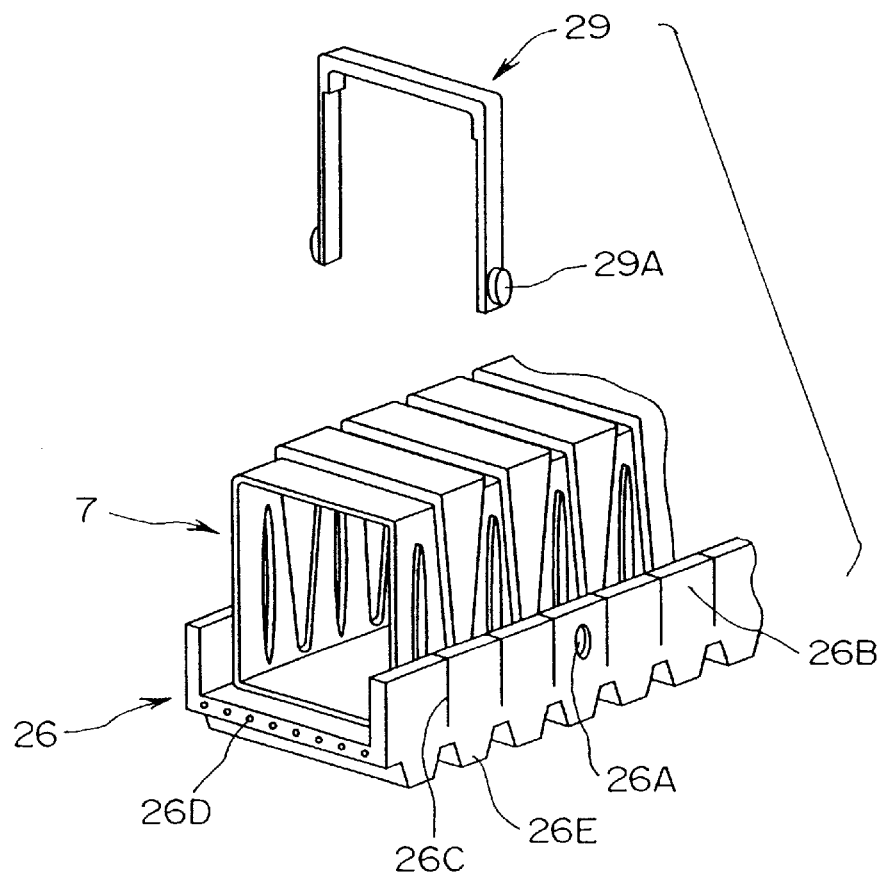
FIG. 5 is a perspective view illustrative of the manner in which a flexible tube is attached to an endless belt of the cable support and guide device shown in FIG. 4.
Figure 6:
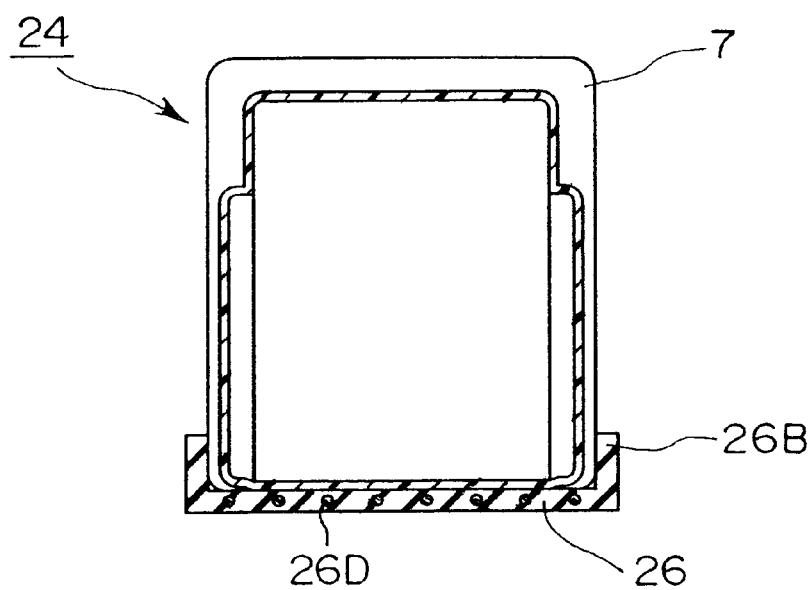
FIG. 6 is a cross-sectional view taken along line VI—VI of FIG. 4.
Figure 7:
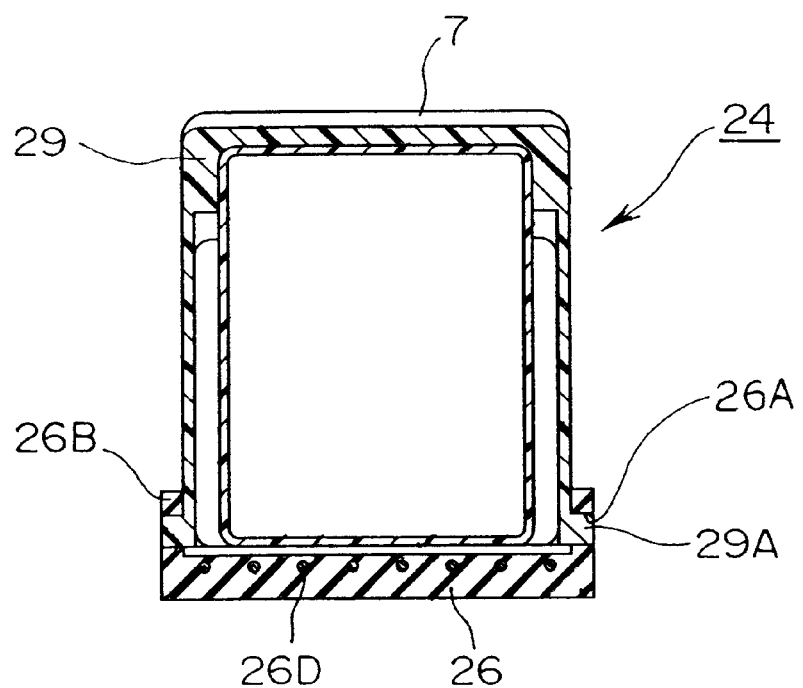
FIG. 7 is a cross-sectional view taken along line VII—VII of FIG. 4.

As shown in FIGS. 5–7, the toothed belt 26 has a pair of side flanges 26B extending along opposite longitudinal edge thereof and projecting in a direction away from the teeth 26E. The side flanges 26E each have a number of transverse slits 26C formed at equal longitudinal intervals to facilitate bending of the toothed belt 26. The toothed belt 26 further has a plurality of pairs of aligned retaining holes 26A formed in the pair of side flanges 26B, respectively, and spaced at equal intervals in the longitudinal direction of the toothed belt 26.

The flexible tubes 7 are attached to the outer circumferential surface of the toothed belt 26 by a plurality of fasteners 29 with the tubes 7 being guidedly received between the side flanges 26B of the toothed belt 26. The fasteners 29 comprise a U-shaped fastener strip formed from a resilient material. In the illustrated embodiment, the fastener strip 29 is molded of synthetic resin. The U-shaped fastener strip 29 has a pair of locking pins 29A projecting laterally and outwardly from distal ends of two legs of the U-shaped fastener strip 29. After each of the flexible tubes 7 is placed on the outer circumferential surface of the toothed belt 26 in such a manner that the flexible tube 7 is received and guided between the side flanges 26B, as shown in FIG. 6, each of the U-shaped fastener strips 29 is placed over the flexible tube 7 with its legs directed toward the toothed belt 26 at a position corresponding to the position of one pair of aligned retaining holes 26A (FIGS. 5 and 7). Then, while forcing the legs to resiliently flex inwardly toward each other, the fastener strip 29 is displaced toward the toothed belt 26 until the locking pins 29A of the U-shaped fastener strip 29 come into alignment with the retaining holes 26A whereupon the legs of the U-shaped fastener strip 29 are allowed to spring back to restore their initial shape. The locking projections 29A of the fastener strip 29 thus snap-fit with the retaining holes 26A of the toothed belt 26, as shown in FIG. 7, so that the flexible tubes 7 are held in position against displacement relative to the toothed belt 26 by means of the fastener strips 29.

When either flexible tube 7 is to be replaced due, for example, to damage, the necessary number of fastener strips 29 are detached from the toothed belt 26 by compressing the legs of each fastener strip 29 to disengage the locking pins 29A from the retaining holes 26A. Thus, the damaged flexible tube 7 can be easily replaced with a new flexible tube.

The flexible tubes 7 may be attached by bonding to the outer circumferential surface of the toothed belt 26 or formed integrally with the toothed belt 26 by a molding process. The term "cables" is used herein in a comprehensive sense, i.e., to broadly refer to various flexible cables, such as electric cables, optical fiber cables, liquid supply hoses and combinations thereof.

As thus far explained, the flexible cable supporting and guiding device of the present invention is able to apply a great tension to the belt which forms part of the movable cable holder. It is, therefor, possible to prevent distortion or twisting which would otherwise occur at horizontal portions of the movable cable holder extending between the pulleys. Even when the traveling stroke of the movable cable holder is relatively long, or the cables accommodated in the cable holder are relatively heavy, the horizontal portions of the cable holder do not cause distortion or twisting.

Since the belt and flexible tubes of the movable cable holder are substantially integral with each other, the movable cable holder is structurally rigid and unlikely to become distorted or twisted. By virtue of such high rigidity, the movable cable holder of the present invention is able to accommodate more cables than those accommodated in the conventional chain type cable holder composed of links having the same cross sectional area.

With the movable cable holder trained around the pulleys, the flexible cable support and guide device has no slide portion and hence does not produce powdery material caused due to abrasive wear. Additionally, the cable support and guide device is highly rigid against deformation and has a long service life. Furthermore, since the belt of the movable cable holder is wound around the pulleys, each of the curved or bent portions of the movable cable holder can maintain an accurate radius of curvature and travel around the pulley with a minimum traveling resistance without causing twisting or tilting. The radius of curvature of the curved portions can be readily changed by replacing the pulleys with another set of pulleys having a different diameter. The belt having reinforcement cords contributes to elongation of the service life of the cable support and guide device.

Obviously, various minor changes and modifications of the present invention are possible in the light of the above teaching. It is therefore to be understood that within the scope of the appended claims, the present invention may be practiced otherwise than as specifically described.

What is claimed is:

1. A flexible support and guide device for cables each adapted to be connected at one end to a mobile machine or a movable machine part and adapted to be connected at the opposite end to fixed power source, said device comprising:

a support rod;

a pair of pulleys rotatably supported on opposite ends of said support rod; and a movable cable holder wound around the pulleys, the movable cable holder including a looped belt trained around the pulleys, and a pair of flexible tubes carried on an outer circumferential surface of the belt with ends of the two tubes confronting each other mutually, the tubes adapted to accommodate the cables within them, said holder having a movable end adapted to be positioned adjacent the mobile machine and formed jointly by one pair of mutually confronting ends of the two tubes, and a fixed end adapted to be positioned adjacent the power source and formed jointly by the other pair of mutually confronting ends of the two tubes, wherein the cables have movable ends adapted to extend from the movable end of the cable holder for connection to the mobile machine or the movable machine part, and the cables have fixed ends adapted to extend from the fixed end of the cable holder for connection to the fixed external power source.

2. A flexible support and guide device according to claim 1, wherein the pulleys have a flat outer circumferential surface, and the belt comprises a flat belt.

3. A flexible support and guide device according to claim 1, wherein the pulleys comprise toothed pulleys each having evenly spaced teeth on an outer circumferential surface thereof, and the belt comprises a toothed belt having evenly spaced teeth on an inner circumferential surface thereof.

4. A flexible support and guide device according to claim 1, wherein the flexible tubes comprise a corrugated tube.

5. A flexible support and guide device according to claim 4, wherein the flexible tubes are made of rubber.

6. A flexible support and guide device according to claim 4, wherein the flexible tubes are molded of synthetic resin.

7. A flexible support and guide device according to claim 4, wherein the flexible tubes are attached by bonding to the outer circumferential surface of the looped belt.

8. A flexible support and guide device according to claim 1, further comprising a plurality of fasteners detachably connected to the belt to attach the flexible tubes to the outer circumferential surface of the belt.

9. A flexible support and guide device according to claim 8, wherein the belt has a pair of side flanges formed on the outer circumferential surface of the belt and extending along opposite longitudinal edges of the belt, and a plurality of pairs of aligned retaining holes formed in the side flanges and spaced at equal intervals in the longitudinal direction of the belt, and the fasteners each comprise a U-shaped fastener strip formed from a resilient material and having a pair of locking pins projecting laterally and outwardly from distal ends of two legs of the U-shaped fastener strip, the locking pins being received in one pair of aligned retaining holes to attach the fastener strip to the belt with the flexible tubes held between the belt and the fastener strip.

10. A flexible support and guide device according to claim 9, wherein the side flanges each have a number of transverse slits formed therein at equal intervals in the longitudinal direction of the side flange.

11. A flexible support and guide device according to claim 9, wherein the flexible tubes comprise a corrugated tube.

12. A flexible support and guide device according to claim 11, wherein the flexible tubes are made of rubber.

13. A flexible support and guide device according to claim 11, wherein the flexible tubes are molded of synthetic resin.

* * * * *